United States Patent [19]

McCreery

[11] 4,318,645
[45] Mar. 9, 1982

[54] CUTTING INSERT
[75] Inventor: James F. McCreery, Latrobe, Pa.
[73] Assignee: Kennametal Inc., Latrobe, Pa.
[21] Appl. No.: 183,028
[22] Filed: Sep. 2, 1980
[51] Int. Cl.³ .............................................. B26D 1/00
[52] U.S. Cl. .................................... 407/114; 407/116
[58] Field of Search ................ 407/113, 114, 115, 116
[56] References Cited
U.S. PATENT DOCUMENTS
3,792,514 2/1974 Ughijima ........................ 407/116 X
3,815,192 6/1974 Ohtsu et al. .......................... 407/114

3,968,550 7/1976 Gehri ................................. 407/114

Primary Examiner—Harrison L. Hinson
Attorney, Agent, or Firm—Lawrence R. Burns

[57] ABSTRACT

A polygonal cutting insert of a hard wear resistant material is described. Located behind the cutting edge land in each corner of this insert is a bump. Separating the bump from the cutting edge land is a lower secondary land. This secondary land has its maximum height and width in the corner areas of the insert. Its height and width gradually decrease as it extends away from the corner area in a direction parallel to the cutting edge.

12 Claims, 4 Drawing Figures

CUTTING INSERT

BACKGROUND OF THE INVENTION

This invention concerns cutting inserts for the metalworking industry and is especially concerned with an indexable cemented carbide cutting insert used with toolholders for machining metal workpieces.

Cutting insert designs and configurations are many in the metalworking art. Some of the more recent configurations may be seen by a review of the McCreery et al U.S. Pat. No. 3,973,307. This patent disclosed a new style cutting insert that recognized that chip control could be effected without the use of molded chipbreaker grooves or superstructures that would impede the flow of the chip and increase the horsepower requirements.

In the industry of metalworking, chip control is very important. When the chip is separating from the workpiece, it is very desirous to have it curl first and then break off from its parent chip so that discrete, individual, curled chips provide a safer environment for the machine operator and, furthermore, enhance safer handling of the waste chips when being further processed or handled in the machine shop or elsewhere.

When referring to the curled chips, the terms tight and loose are used. Tight refers to the condition where the chip is tending to curl too much and chips may break off in a smaller size than would be desired. On the other hand, loose chips are chips that are not curling as much as the ideal chip and may be breaking off in larger size chips than would be desired. Within certain ranges of tight chips and loose chips, the chips may be acceptable in metalworking production, unless a chip is referred to as too tight and too loose, in which case the chips are then unacceptable.

The tightness of the curled chip affects power consumption and the rate of wear of the cutting insert. As the tightness of the curled chip increases, the pressure with which the chip contacts the insert increases, thereby producing increased cratering of the insert in the area of contact. This situation leads to increased power consumption and reduced insert life time.

Prior insert designs, such as McCreery et al, have consisted of a polygonal body having top and bottom faces joined by a peripheral wall. Formed at the juncture of one face wih the peripheral wall are two adjoining and angular related cutting edges forming a corner. Extending inwardly from the cutting edges is a land area. At the inner edge of the land area is a descending wall which joins a horizontal face which extends toward the center of the insert.

Inserts of this general class have been found to be efficient and have good chip control over a range of speeds, feeds and types of metal workpieces. However, when these inserts are used on long continuous machining operations on a single workpiece, there has been a tendency for the cutting edge around the corner or nose area of the insert to break off. This tendency toward early failure of the corner area in these applications is believed to be due to an increased rate of cratering occurring on the angularly related land and descending wall near the corner and behind the edge doing the cutting. A possible mechanism, explaining the cause of increased cratering, is as follows: As a chip is formed at the cutting edge, it slides down the descending wall, contacts the horizontal face and is caused to curl. However, in the nose or corner area, where the cutting edge land and descending wall join the adjacent and angularly related land and descending wall, which for clarity are now called the side land and side descending wall, a problem arises.

The side land and side descending wall interfere with the free flow of the chip down the nearby cutting edge descending wall. That end of the chip contacting the side land and side descending wall takes on a tighter curl than the rest of the chip away from the corner area. In the area of contact between the chip and the side land and side descending wall, higher contact pressures are produced than are produced along the cutting edge descending wall. This causes an increased rate of cratering in this contact area thereby weakening the corner area and producing the observed tendency for the corner area to be the first portion of the insert to fail during long machining runs.

This tendency for early failures in the corner area of the insert during long machining runs has not been alleviated by the addition of a secondary land or step behind the descending wall as illustrated in Mundy U.S. Pat. No. 4,087,193.

It should also be noted that, while bumps have been placed on inserts in the past (see, for example, U.S. Pat. No. 4,214,845), they have not been used in conjunction with a secondary land to achieve a reduction in the rate of crater wear on the side land and descending wall. Their primary use has been as chip groovers and chip breakers.

BRIEF SUMMARY OF THE INVENTION

According to the present invention, a hard wear resistant insert, preferably, a molded insert which is made, for example, from a cemented hard metal carbide, ceramic, or the like, is provided with a configuration for more efficiently removing metal and for reducing the rate of crater wear on the side land and descending wall near the corner area of the cutting edge.

The insert has a polygonal body having top and bottom faces joined by a peripheral wall having rounded corners. Formed at the juncture of at least one face with the peripheral wall are at least two angularly related cutting edges. Joined to, and located behind, each cutting edge is a land area which extends inwardly toward the center of the polygonal body. At the inner edge of each land area, a descending wall is formed which also extends inwardly of the cutting edge of the polygonal body.

In the area of the corner, a secondary land area is formed. It joins the inward edge of the descending wall and extends inwardly toward the center of the polygonal body. The width of this secondary land is at a maximum in the corner and decreases as it extends away from the corner area. Joined to the inner edge of the secondary land area is a secondary descending wall which extends inwardly from said secondary land and terminates by joining a planar face which also extends inwardly toward the center of the body.

The secondary land is located at a secondary height above the planar face. The height of the secondary land varies around the periphery of the insert. This secondary height is a maximum in the corner area and diminishes as the secondary land extends away from the corner area.

In addition, a bump is located in the corner area. This bump has sufficient height to rise above the height of the secondary land.

It is a preferred embodiment of this invention that the secondary land width decreases to zero at a point intermediate adjacent corners.

It is also preferable that the height of said secondary land diminish to zero at a point intermediate adjacent corners.

It is a preferred embodiment of this invention that this bump be separated from the descending wall by the secondary land and be positioned such that it is joined to the secondary land, the secondary descending wall and the planar face.

It is also preferred that the bump be centered on a bisector of the corner.

It is most preferred that the bump be located 0.045 to 0.060 inches from said corner cutting edge as measured from said corner cutting edge along the bisector to a point located on the bisector where the bump joins the secondary land.

It is further preferred that the maximum height of the bump be no higher than the height of the land area above the planar face plus 0.002 inches and that the bump have the shape of a segment of a spheroidal shape, preferably a sphere.

It is also a preferred embodiment of this invention that the land area width be at a minimum in the corner areas.

It is, furthermore, preferred that the land area and planar face are substantially parallel to each other and that the land area be substantially perpendicular to the peripheral wall of the cutting insert.

In cutting inserts utilizing the above design, the bump in conjunction with the secondary land, whose width and height gradually decrease as it extends from the corner, act to tilt the chip up in the corner area, thereby reducing the rate of cratering on the side land and side descending wall in the corner area. With the bump and secondary land positioned as described, on deep cuts a conical chip having its larger diameter end away from the corner will be formed, and the power requirement reduced over inserts of the designs described in the background.

It is, therefore, a primary objective of this invention to produce a cutting insert having a tapered secondary land and corner bump so configured so as to reduce the rate of crater wear on the side land and side descending wall in the corner area of the insert.

It is also an objective of this invention to produce a cutting insert having a tapered secondary land and bump so configured so as to reduce cutting power consumption.

BRIEF DESCRIPTION OF THE DRAWINGS

The exact nature of the present invention will become more clearly apparent upon reference to the following detailed specification taken in connection with the accompanying drawings in which.

DETAILED DESCRIPTION OF THE INVENTION

Figure 1:
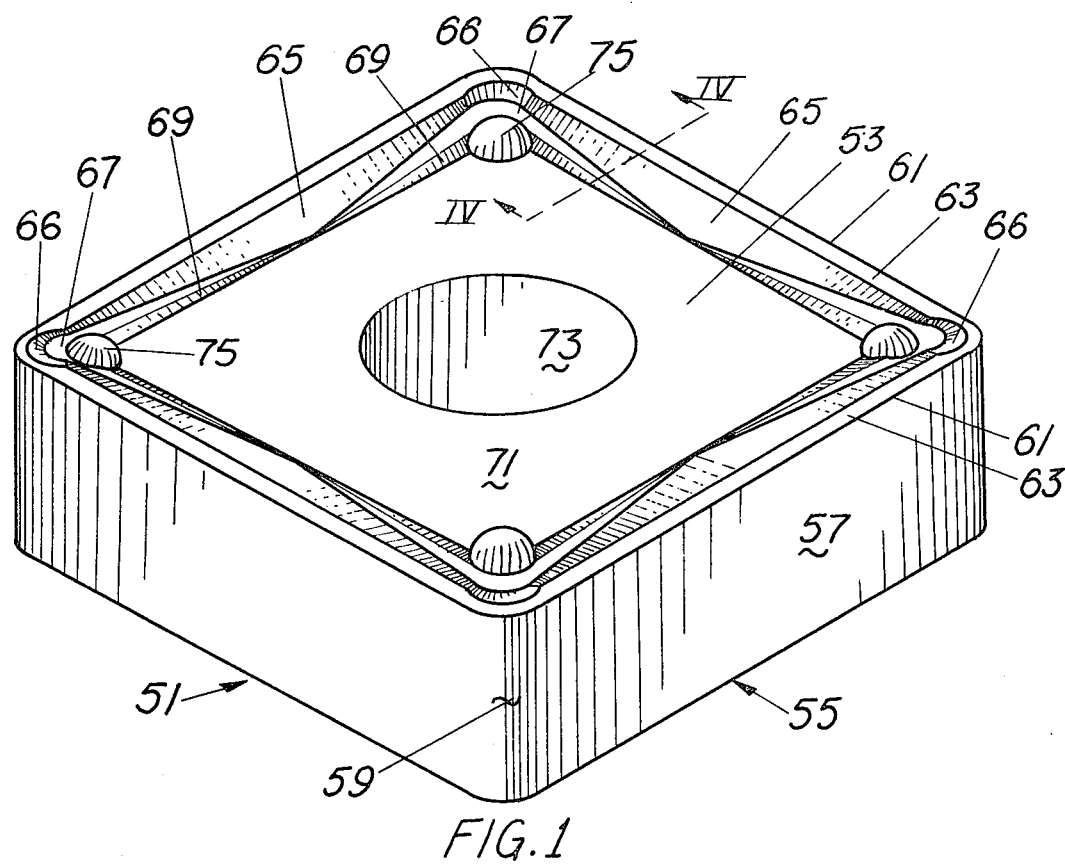
FIG. 1 is an isometric view of an embodiment of a cutting insert according to the present invention.

Referring to the drawings somewhat more in detail, shown in FIG. 1 is an embodiment of a cutting insert according to the present invention. The insert has a polygonal body 51 having top face 53 and bottom face 55 joined by a peripheral wall 57 having rounded corners 59. Formed at the juncture of at least one face with the peripheral wall 57 are at least two angularly related cutting edges 61. Joined to and located behind each cutting edge 61 is a land area 63 which extends inwardly toward the center of the polygonal body 51.

At the inner edge of each land area 63, descending wall 65 intermediate adjacent corners and a descending wall 66 in the corner areas are formed and extend inwardly of the cutting edges 61 of the polygonal body 51. In the area of the corner 59, a secondary land area 67 is formed. It joins the inward edge of the descending wall 66 and 65 and extends inwardly toward the center of the polygonal body 51.

The width of the secondary land 67 is at a maximum in the corner areas 59 and gradually decreases to zero at a point intermediate adjacent corners. Joined to the inner edge of the secondary land 67 is a secondary descending wall 69 which extends inwardly from said secondary land 67 and terminates by joining a planar face 71 which also extends inwardly toward the center of the body 51.

At the center of the polygonal body 51 there may be a perforation 73 which communicates between the top face 53 and the bottom face 55. Perforation 73 is used for engagement with a locking pin (not shown) for securely holding the cutting insert onto a toolholder body.

Returning to a discussion of the secondary land 67, it can be seen in FIG. 1 that the secondary land 67 is located at a height above the planar face 71. The height of the secondary land varies around the periphery of the insert. This height is a maximum in the corner areas 59 and diminishes to zero at a point intermediate adjacent corners 59.

The embodiment of the invention shown in FIG. 1 shows that both height and width of the secondary land 67 decrease to zero at a point intermediate adjacent corners. However, while not shown in FIG. 1, it is within the scope of this invention to have the height and the width of the secondary land 67 diminish to some non-zero minimum values intermediate the corners. Alternatively, the height of the secondary land 67 may diminish to zero at a finite non-zero width or the width of the secondary land 67 may diminish to zero at some finite non-zero height above the planar floor 71.

In addition, it can be seen in FIG. 1 that a bump 75 is located in each corner area 59. The bump has a height sufficient to rise above the height of the secondary land 67. As shown in FIG. 1, it is a preferred embodiment of this invention that the bump be separated from the descending wall 65 by the secondary land 67. The bump 75 should be so positioned such that it is joined to the secondary land 67, the secondary descending wall 69 and the planar face 71.

Figure 2:
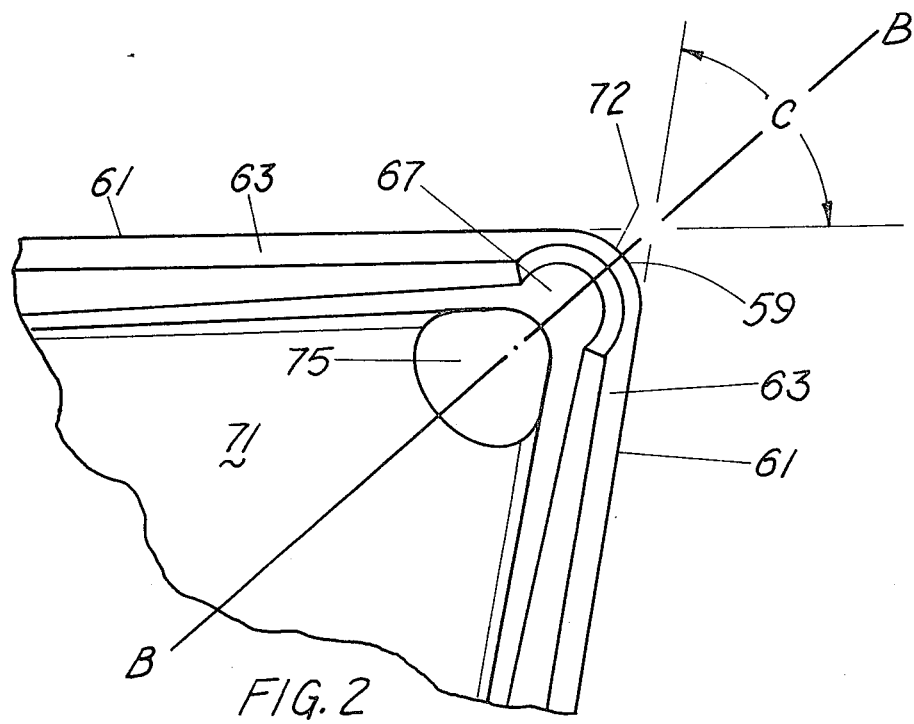
FIG. 2 is a top view of a corner area of the cutting insert shown in FIG. 1.

Referring now to FIG. 2, which is an enlargement of one of the corner areas 59, it can be seen that the bump 75 is preferably centered on a bisector B—B of the corner angle C formed by the adjacent angularly related cutting edges 61. It is most preferred that the bump be located 0.045 to 0.060 inches from said corner cutting edge 72 as measured from the corner cutting edge along the bisector B—B to a point located on the bisector where the pump 75 joins the secondary land 67.

The position of the bump behind the cutting edge is critical in that, if it is out too far from the cutting edge, it does not serve to control the chip or lift the chip up, and if it is too close to the cutting edge, it will tend to crowd the chip and make the chip too tight.

It is also preferred that the maximum height of the bump be no higher than 0.002 inches above the height of the land area 63 above the planar face 71 and that the bump have a shape of a segment of a spheroidal shape, preferably a sphere.

Figure 3:
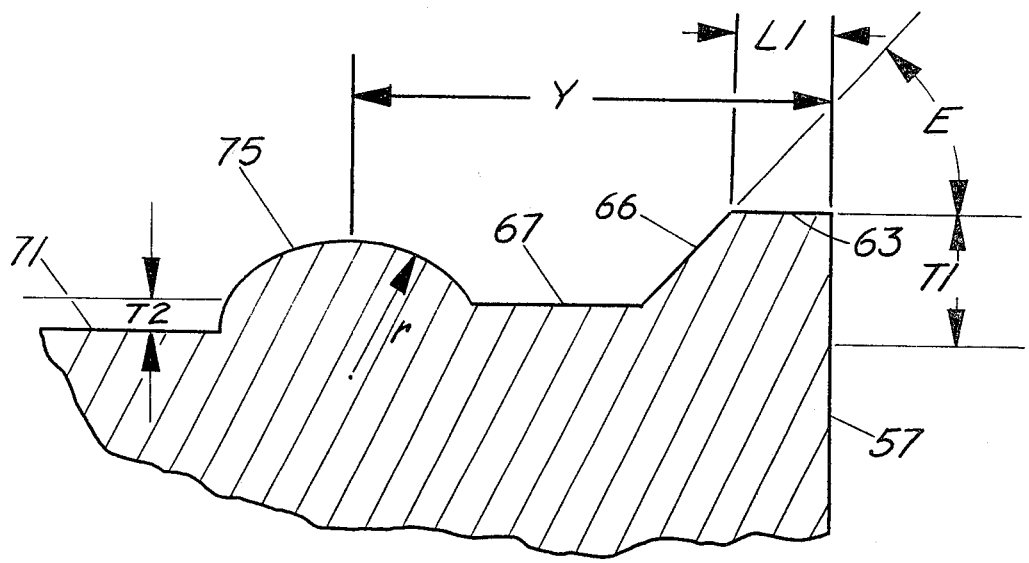
FIG. 3 is a cross section of the corner area shown in FIG. 2 taken along the bisector B—B of the corner angle C.

These relationships are more clearly shown in FIG. 3 which is a cross section along the bisector B—B through the corner area. It can be seen that the bump 75 may be a portion of a sphere having a radius r which intersects the secondary land 67 and the planar face 71.

The maximum height of the bump, or the center of the sphere of which the bump 75 forms a part, is located a distance Y behind the corner cutting edge. It is preferred that Y be between 0.065 to 0.080 inches from the corner cutting edge.

Figure 4:
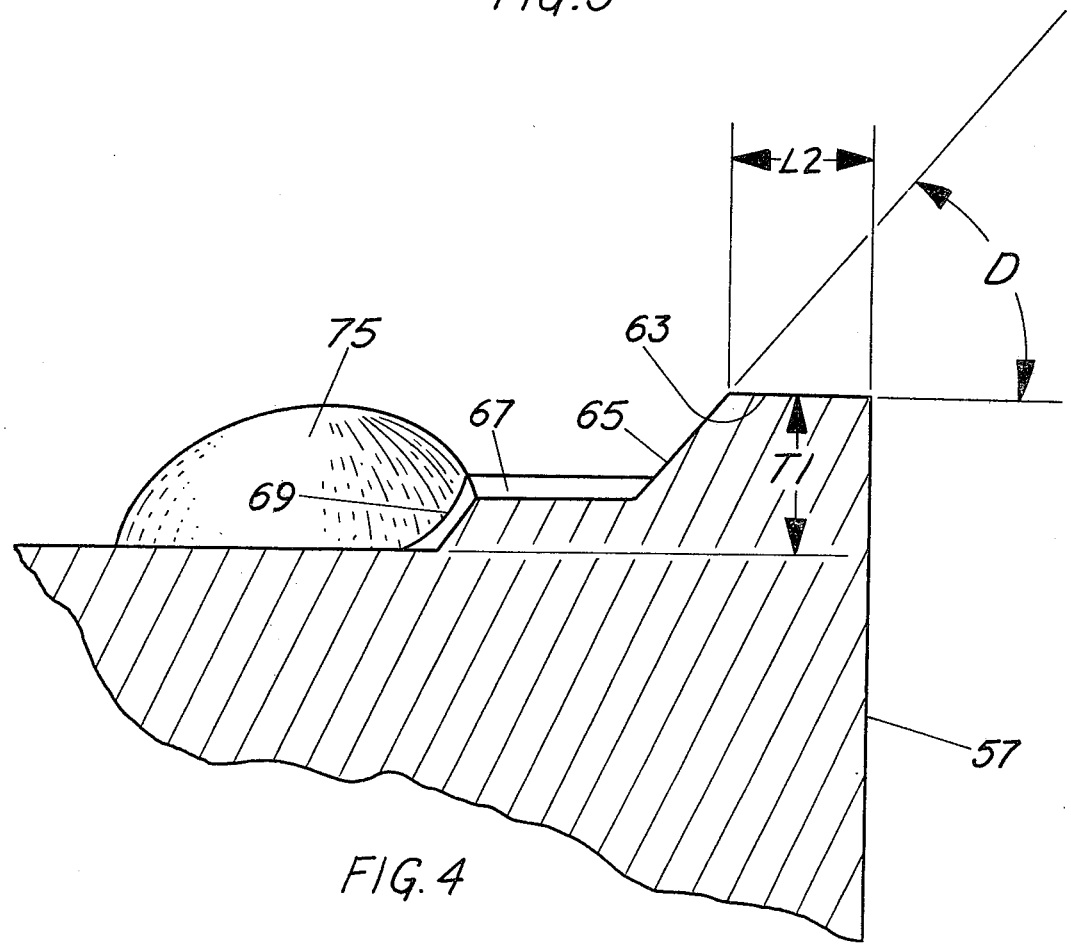
FIG. 4 is a partial cross section of the cutting insert shown in FIG. 1, taken intermediate two adjacent corners and viewed along arrows IV—IV.

Referring now to FIGS. 3 and 4, the cutting edge land 63 may vary in width from the corner areas to the areas intermediate adjacent corners of which FIG. 4 is a representative cross section. It will be noted that the land area 63 width may be a minimum in the corner areas. This is especially true for cutting inserts that are going to be used for light cuts. For more heavy duty cutting inserts, the land width between the corner and the areas immediate adjacent corners may be equal. For the embodiment of the cutting insert shown in FIGS. 3 and 4, the land width L2 intermediate adjacent corners is preferred to be 0.0010 to 0.0014 inches, but may be larger in heavy duty inserts. The land width in the corner areas 59, L1, should be 0.005 to 0.009, but may be as large as L2 in heavy duty designs.

The height of the cutting edge T1 above the planar floor 71 is preferred to be approximately 0.010 inches, but may be varied substantially depending upon the applications on which the cutting insert is going to be used. The height of the secondary land 67 in the corners above the planar floor 71, shown in the figures as dimension T2, should be approximately one-half the height T1 of the land 63 above the planar face 71.

It will be noted, however, that the width and height of the secondary land 67 decreases as it extends away from the corners. This is most clearly shown in FIG. 4 and FIG. 1.

In FIG. 3, it can be seen that the descending wall 66 forms an angle E with the cutting edge land 63. This angle E is nominally 25 degrees, but can be varied substantially, depending upon the application, to help obtain the desired chip sizes. Away from the corner areas, the angle that the descending wall 65 makes with the cutting edge land 63 is not as steep as angle E in the corners. As shown in FIG. 4, this angle D should be approximately 20 degrees. This angle may also be changed to control chip size in specific applications.

As shown in FIGS. 3 and 4, the land area 63 should be substantially parallel to the planar face 71 and substantially perpendicular to the peripheral wall 57. It is also preferable that the secondary land 67 be substantially parallel to land 63.

The secondary land 67 helps to control the chip configuration in conjunction with the bump 75 and the angle and height of the descending wall 65 and 66, and land 63, respectively. In the corner areas 59, the secondary land 67 acts with the bump 75 to lift that end of the chip upward. This upward lifting of the chip in the corner areas 59 would be resisted by the secondary land in the area intermediate the corners 59 if the secondary land 67 intermediate the corners was as wide and as high as it is in the corners. However, by reducing the height and width of the secondary land 67 in the area intermediate the corners so that the chip is allowed to more freely tilt upward in the corner, this problem is avoided. In this manner, the secondary land 67 and bump 75 cooperate to reduce the rate of crater wear on the side cutting edge land and side descending wall, and form a conical chip at deep depths of cut.

Modifications may be made within the scope of the appended claims.

What is claimed is:

1. A cutting insert which comprises: a polygonal body having top and bottom faces with a peripheral wall having rounded corners joining said top and bottom faces; at least two angularly related cutting edges formed at the juncture of at least one face with said peripheral wall; a land area extending inwardly toward the center of said body from said cutting edge; a descending wall joining an inner edge of said land area and extending inwardly of the cutting edge of said polygonal body; a secondary land area in the area of said corner joining an inward edge of said descending wall and extending inwardly toward the center of the polygonal body; said secondary land having a width which is at a maximum in the corner and which decreases as the secondary land extends away from said corner; a secondary descending wall joining and extending inwardly from said secondary land; a planar face joining said secondary descending wall and extending inwardly toward the center of said body; said secondary land located at a secondary height above the planar face; said secondary height being a maximum in the corner area and diminishing as the secondary land extends away from said corner; and a bump located in the corner area and rising above said secondary land.

2. A cutting insert according to claim 1 wherein said secondary land width decreases to zero at a point intermediate adjacent corners.

3. A cutting insert according to claim 1 wherein said secondary height of said secondary land diminishes to zero at a point intermediate adjacent corners.

4. A cutting insert according to claim 2 wherein said secondary height of said secondary land diminishes to zero at a point intermediate adjacent corners.

5. A cutting insert according to claims 1, 2, 3 or 4 wherein said bump is joined to said secondary land, said secondary descending wall and said planar face and is separated from said descending wall by said secondary land.

6. A cutting insert according to claim 5 wherein only one bump is located in said corner and said bump is centered on a bisector of said corner.

7. A cutting insert according to claim 6 wherein said bump is located 0.045 to 0.060 inches from said corner cutting edge as measured from said corner cutting edge along said bisector to a point located on said bisector where said bump joins said secondary land.

8. A cutting insert according to claim 7 wherein said bump has a maximum height above said planar face which is less than the height of said land area above said planar face plus 0.002 inches.

9. A cutting insert according to claim 5 wherein said bump is a segment of a spheroidal shape.

10. A cutting insert according to claims 1 or 2 wherein said land area has a width which is a minimum in the corner areas.

11. A cutting insert according to claim 10 wherein said land area and said planar face are substantially parallel to each other.

12. A cutting insert according to claim 11 wherein said land area is substantially perpendicular to said peripheral wall.

* * * * *